(12) United States Patent
Reineck

(10) Patent No.: US 7,967,307 B2
(45) Date of Patent: *Jun. 28, 2011

(54) HEAVY DUTY TRAILING ARM SUSPENSION SYSTEM

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1424 days.

This patent is subject to a terminal disclaimer.

(21) Appl. No.: 11/085,643

(22) Filed: Mar. 21, 2005

(65) Prior Publication Data

US 2005/0161896 A1    Jul. 28, 2005

Related U.S. Application Data

(63) Continuation-in-part of application No. 10/194,780, filed on Jul. 12, 2002, now Pat. No. 6,871,864, and a continuation-in-part of application No. 10/194,817, filed on Jul. 12, 2002, now Pat. No. 6,886,840.

(51) Int. Cl.
*B60G 3/14* (2006.01)
*B60G 15/06* (2006.01)
*B60G 15/12* (2006.01)

(52) U.S. Cl. ... 280/124.106; 280/124.107; 280/124.116; 280/124.157

(58) Field of Classification Search ........... 280/124.107, 280/124.128, 124.153, 124.132, 124.13, 280/124.116, 124.157, 124.106

See application file for complete search history.

(56) References Cited

U.S. PATENT DOCUMENTS

| 3,292,944 A | * | 12/1966 | Dangauthier | 280/124.107 |
| 3,406,983 A | * | 10/1968 | Masser | 280/124.162 |
| 4,309,045 A |   | 1/1982  | Raidel |  |

(Continued)

FOREIGN PATENT DOCUMENTS

WO    WO 01/38113    5/2001

(Continued)

OTHER PUBLICATIONS

EP 03 25 4315 Search Report.

(Continued)

*Primary Examiner* — Paul N Dickson
*Assistant Examiner* — Joseph Rocca
(74) *Attorney, Agent, or Firm* — Carlson, Gaskey & Olds, PC

(57) ABSTRACT

The present invention provides a heavy duty suspension system including a frame and a pair of spaced apart trailing arms. The trailing arms have at least a portion with an open bottom and flanges extending away from the opening. The trailing arm preferably has a generally U-shaped cross-section over a substantial portion of its length. An axle has opposing end portions pivotally supported respectively on the trailing arms. A V-rod includes first and second spaced apart ends extending to a common third end with the first and second ends preferably pivotally attached to the frame. The third end is preferably pivotally attached to the axle. The V-rod provides lateral stability and defines a pinion angle with the trailing arms. The trailing arms extend longitudinally from the forward portion to a rearward portion. An anti-roll bar includes opposing end portions and a central portion transverse to and extending between the end portions. The end portions are respectively arranged longitudinally along a portion of the trailing arms and are pivotally secured respectively to the trailing arms.

10 Claims, 2 Drawing Sheets

U.S. PATENT DOCUMENTS

| | | | | |
|---|---|---|---|---|
| 4,415,179 A * | 11/1983 | Marinelli | ............... | 280/124.116 |
| 4,486,030 A * | 12/1984 | Takata et al. | ........... | 280/124.107 |
| 4,717,171 A * | 1/1988 | Kami et al. | ................... | 280/834 |
| 5,037,126 A * | 8/1991 | Gottschalk et al. | .... | 280/124.116 |
| 5,039,124 A * | 8/1991 | Widmer | ................. | 280/124.116 |
| 5,203,585 A * | 4/1993 | Pierce | .................... | 280/124.116 |
| 5,308,115 A * | 5/1994 | Ruehl et al. | ................... | 280/785 |
| 5,443,280 A * | 8/1995 | Kawaguchi et al. | ... | 280/124.128 |
| 5,524,921 A * | 6/1996 | Ellingsen | ............... | 280/124.116 |
| 5,639,110 A * | 6/1997 | Pierce et al. | ........... | 280/124.116 |
| 5,649,719 A * | 7/1997 | Wallace et al. | ........ | 280/124.156 |
| 5,711,544 A * | 1/1998 | Buhl | ....................... | 280/124.116 |
| 6,039,336 A * | 3/2000 | Frey | ....................... | 280/124.128 |
| 6,089,583 A * | 7/2000 | Taipale | .................... | 280/124.13 |
| 6,123,349 A * | 9/2000 | Depue | ................... | 280/124.106 |
| 6,196,564 B1 * | 3/2001 | Hawener et al. | ........ | 280/124.162 |
| 6,267,526 B1 * | 7/2001 | McLaughlin | .................. | 403/150 |
| 6,375,203 B1 * | 4/2002 | Warinner et al. | ............ | 280/81.6 |
| 6,471,223 B1 * | 10/2002 | Richardson | ................. | 280/86.5 |
| 6,508,482 B2 * | 1/2003 | Pierce et al. | ........... | 280/124.116 |
| 6,511,084 B1 * | 1/2003 | Buhl et al. | ............. | 280/124.107 |
| 6,523,841 B2 * | 2/2003 | Glaser et al. | ........... | 280/124.106 |
| 6,527,286 B2 * | 3/2003 | Keeler et al. | ........... | 280/124.135 |
| 6,533,299 B2 * | 3/2003 | Platner | ....................... | 280/124.1 |
| 6,533,300 B1 * | 3/2003 | Hicks et al. | ............ | 280/124.106 |
| 6,557,875 B2 * | 5/2003 | Schlosser et al. | ...... | 280/124.153 |
| 6,607,205 B2 * | 8/2003 | Platner | .................. | 280/124.116 |
| 6,666,474 B2 * | 12/2003 | Pavuk | ........................... | 280/677 |
| 6,733,020 B2 | 5/2004 | Reineck | | |
| 6,871,864 B2 | 3/2005 | Reineck | | |
| 6,886,840 B2 * | 5/2005 | Reineck | ................ | 280/124.107 |
| 7,789,405 B2 * | 9/2010 | Lie | ........................ | 280/124.116 |
| 2001/0009321 A1 * | 7/2001 | Toyoshima et al. | ........ | 280/86.75 |
| 2001/0030406 A1 * | 10/2001 | Pierce | .................... | 280/124.116 |
| 2003/0214118 A1 * | 11/2003 | Pavuk | ........................... | 280/678 |
| 2004/0007845 A1 | 1/2004 | Reineck | | |

FOREIGN PATENT DOCUMENTS

| | | |
|---|---|---|
| WO | WO 01/38113 A1 | 5/2001 |

OTHER PUBLICATIONS

EP 03 25 4314 Search Report.
EP 03 25 4363 Search Report.
"ADL Series Drive Axle Air-Ride Suspension", Freightliner, Nov. 2001, pp. 1-2, Muskegon, Michigan.

* cited by examiner

HEAVY DUTY TRAILING ARM SUSPENSION SYSTEM

This application is a Continuation-In-Part of U.S. Ser. Nos. 10/194,780 now U.S. Pat. No. 6,871,864 and 10/194,817 now U.S. Pat. No. 6,886,840, both of which were filed on Jul. 12, 2002.

BACKGROUND OF THE INVENTION

This invention relates to a heavy duty suspension system, and more particularly, the invention relates to a trailing arm suspension system.

Various types of suspension configurations have been used for heavy duty applications. For drive axles, the suspension geometry affects a pinion angle. The pinion angle is the angle between an axle input shaft axis and a drive shaft axis. It is desirable to have as little pinion angle as possible to reduce wear. Additionally, it is desirable to have equal angles for the drive shaft axis and the axle input shaft axis and the transmission output shaft axis to balance the forces on the yokes.

Trailing arm suspensions have been employed for heavy duty applications, such as for motorhomes. An axle may be rigidly or pivotally secured to the trailing arm. For drive axle trailing arm suspensions, such as for motorhome applications, the pinion angle of the axle is frequently defined by an upper attachment member. The upper attachment member and the trailing arm define the pinion angle during the operation of the suspension. One suspension configuration has employed a rod arranged longitudinally between the frame and the axle to define the pinion angle. This configuration additionally employs a lateral rod connected between the axle and the frame. Such a configuration of rods has the undesirable effect of moving the axle input shaft along an arcuate path in a vertically lateral plane during suspension operation. Instead of the rods, the upper attachment member may be defined by a triangular plate. The apex of the plate is pivotally attached to the axle and the side opposing the apex is attached between opposing frame rails. However, the plate lacks sufficient structural integrity as an upper attachment member and is difficult to install and service.

Suspension systems utilize anti-roll bars to stabilize the vehicle during a turning maneuver. One conventional type of anti-roll bar utilized on passenger vehicles includes ends that are secured to a suspension component such as a lower control arm. A central portion extends between the ends and is supported on the frame of the vehicle by brackets and bushings. As the control arms move during a turning maneuver, the anti-roll bar rotationally deflects and acts against the frame to provide vehicle stability. Supporting an anti-roll bar by a frame for heavy duty vehicle applications is not practical since the suspension components may be spaced a significant distance from the frame so that a portion of the frame may not be located sufficiently close to the anti-roll bar.

A heavy-duty trailing arm suspension system has been proposed that utilizes a torque tube extending between the trailing arms. The torque tube is welded to an adaptor plate that is supported by numerous bushings. To service the torque tube, the adaptor plate and all of the supported suspension components must be removed. The adaptor plate supports many other suspension components such as a shock absorber and/or air spring. The adaptor plate may also support the axle. As a result, the numerous bushings receive load inputs from various components. Accordingly, it is difficult to isolate any one bushing to optimize the roll characteristics.

SUMMARY OF THE INVENTION AND ADVANTAGES

The present invention provides a heavy duty suspension system including a frame and a pair of spaced apart trailing arms. The trailing arms each include a forward portion pivotally supported by the frame and extending longitudinally to a rearward portion. An axle has opposing end portions pivotally supported respectively on the trailing arms. A V-rod includes first and second spaced apart ends extending to a common third end with the first and second ends preferably pivotally attached to the frame. The third end is preferably pivotally attached to the axle. The V-rod provides lateral stability and defines a pinion angle with the trailing arms. Preferably, the longitudinal length of the V-rod, and a length of the trailing arm measured from the pivotal attachment on the frame to the pivotal attachment on the axle, are of equal length to provide a constant pinion angle during movement of the suspension system.

The present invention also provides an anti-roll bar having opposing end portions and a central portion transverse to and extending between the end portions. The end portions are respectively arranged longitudinally along a portion of the trailing arms and are pivotally secured respectively to the trailing arms. The end portions may be secured to the trailing arms by threaded fasteners and further supported on the trailing arm by a bracket having a bushing. At least a portion of the end portion is received in a pocket or channel in the trailing arm so that the end portion does not extend below the trailing arm.

Accordingly, the above invention provides an improved heavy duty trailing arm suspension system.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
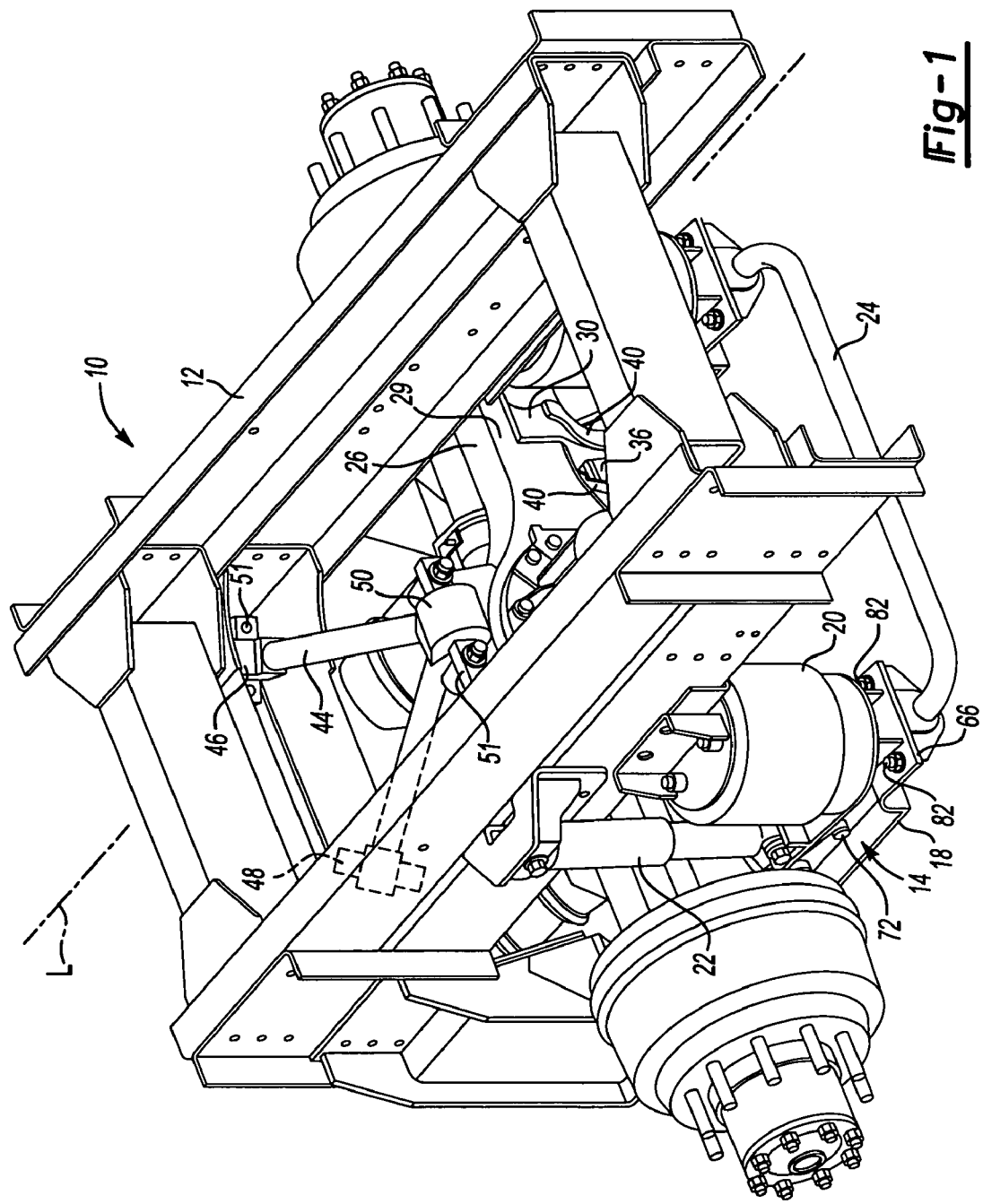
FIG. 1 is a top rearward perspective view of the present invention suspension system.
Figure 2:
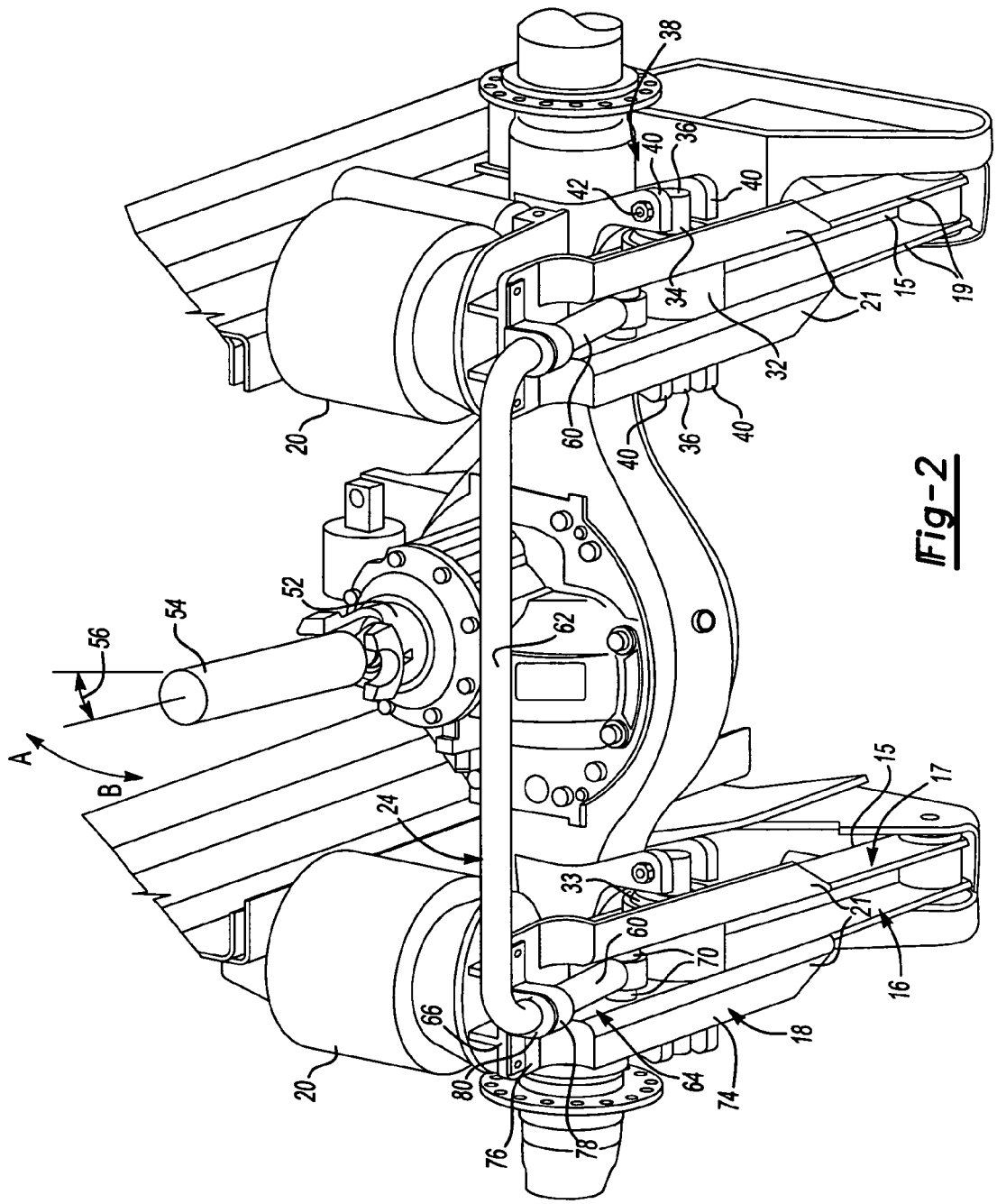
FIG. 2 is a bottom rearward perspective view of the suspension system shown in FIG. 1.

A suspension system 10 is shown in FIGS. 1 and 2. The system 10 includes a frame 12 that may include longitudinal rails, brackets, and other structural members secured by welds, fasteners or other attachment means. The suspension system 10 includes a pair of spaced apart trailing arms 14. The trailing arms 14 are preferably formed of a rather thick metal forming having opposing sides 19 and an upper wall 15 adjoining the opposing sides 19 to form an inverted U-shape. The lower side 16 has spaced apart flanges 21 extending outwardly from the opposing sides 19 and provides an opening forming a channel 64, as best shown in FIG. 2.

The trailing arms 14 include a forward portion 17 pivotally attached to the frame 12 and extending longitudinally rearward to a rearward portion 18. Air springs 20 and shock absorbers 22 may be arranged between the trailing arms 14 and the frame 12. An anti-roll bar 24 may be removably secured between the trailing arms 14 to provide stability to the vehicle during turning maneuvers.

The suspension system 10 extends along a longitudinal axis L. An axle 26 includes opposing end portions 29 that are pivotally secured to the trailing arms 14 via brackets 30. The trailing arms 14 may include a sleeve 32 welded between the opposing sides of the trailing arm 14, in the example shown. A pin 34 may be disposed within each sleeve 32 and laterally located using a flexible material 33 which provides some compliance during movement of the suspension. The pins 34 include opposing ends 36 with apertures (not shown). A conventional bushing arrangement may be used such as the one depicted on the forward portion 17. The brackets 30 include an upper end attached to the end portions 29 of the axle 26 by welding or other attaching means. The brackets 30 includes lower ends 38 having spaced apart legs 40. Each of the legs 40 are secured to the opposing ends 36 by fastening members 42. Each bracket 30 straddles the trailing arm 14 such that the legs 40 are on either side of the trailing arm 14.

A V-rod 44 is attached between the frame 12 and the axle 26 to provide stability to the axle 26 during movement of the suspension. The V-rod 44 includes first 46 and second 48 ends extending to a common third end 50. The first 46 and second 48 ends are pivotally secured to the frame by a pin 51 rotatably received in the ends and secured to the frame 12 by fastening members. Similarly, the third end 50 is secured to the axle 26 by pin 51 rotatably received in the end and secured to the axle 26 by fastening elements.

The axle includes an input shaft 52 receiving rotational drive from a driveshaft 54 from an engine, typically located rearward of the suspension system 10 for motor home applications. The pinion angle is defined by the configuration of the trailing arms 14 and the V-rod 44. The present suspension system configuration is that of a parallelogram, preferably so that the pinion angle 56 remains constant as the suspension system moves between first A and second B positions. Said another way, the pivotal attachment from the trailing arm 14 to the frame 12 to the pivotal attachment of the trailing arm 14 to the axle 26 defines a first length. The longitudinal distance from the first and second ends 46 and 48 to the third end 50 defines a second length. The first and second lengths are equal. The vertical distance from the first and second ends 46 and 48 and the pivotal connection from the trailing arm 14 to the frame 12 defines a third length. The vertical distance from the third end 50 and the pivotal connection between the axle 26 and the trailing arm 14 defines a fourth length. The third and fourth lengths are equal. In this manner, a parallelogram suspension configuration is provided in which the pinion angle 56 is maintained during movement of the suspension between first A and second B positions.

The anti-roll bar 24 is arranged laterally between the trailing arms 14 and is preferably connected between the rearward portions 18. The anti-roll bar 24 may include end portions 60 and a central portion 62 transverse to and extending between the end portions 60. The central portion 62 may be bent in any suitable shape. The trailing arms 14 includes a pocket or channel 64 opening downward and receiving the end portions 60. The end portions 60 extend longitudinally generally in the same longitudinal direction as the trailing arms 14. The end portions 60 are located approximately beneath the air springs 20, in the example shown. Each of the rearward portions 18 includes a terminal end 66 with the anti-roll bar 24 extending rearwardly beyond the terminal ends 66.

The spaced apart bushings 70 may be received in opposing sides 19 providing a pivotal connection. A threaded fastener 72, best shown in FIG. 1, is disposed within the bushings 70 to pivotally secure the end portions 60 to the trailing arms 14. The trailing arms 14 have a bottom surface 74 defining a lower plane. The bottom surface 74 may be lateral walls or flanges 21 extending outwardly from the opposing sides 19 or the edges of the opposing sides 19. An anti-roll bar support plate 76 may include a portion spaced upwardly from the lower plane and secured to each of the trailing arms 14 by welding, in the example shown. Brackets 78 having flexible bushings 80 may additionally support the end portions 60 to each of the trailing arms 14. The brackets 78 may be secured to the trailing arms 14 by fasteners 82, as best shown in FIG. 1. The brackets 78 are spaced rearwardly from the pivotal connections. The anti-roll bar 24 may be serviced by removing the fasteners 72 and 82.

During operation of the suspension such as turning maneuvers, the end portions 60 undergo torsion. The central portion 62 also undergoes torsion as well as bending. The present invention anti-roll bar configuration provides increased stiffness as compared to prior art configurations.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A trailing arm for a vehicle suspension comprising:
   a forward portion including a pivot about which said trailing arm rotates, said forward portion extending longitudinally to a rearward portion with said trailing arm having at least a portion with an open bottom defined by a generally U-shaped cross-section, said U-shaped cross-section defined by opposing sides and an upper wall adjoining said opposing sides, wherein lateral flanges extend outwardly from each of said opposing sides and away from each other, wherein an air spring support plate is supported above said rearward portion opposite said open bottom, said open bottom extending from said pivot to beneath said air spring support plate, and including a shock absorber mount on said trailing arm between said forward and said rearward portions.

2. The trailing arm according to claim 1, wherein said rearward portion includes generally vertical opposing sides defining said open bottom with said lateral flanges extending outwardly from each of said opposing sides and away from one another.

3. The trailing arm according to claim 2, wherein an axle attachment member is supported by said opposing sides and above said lateral flanges.

4. The trailing arm according to claim 1, wherein said open bottom exposes said upper wall from said pivot point to said air spring support plate.

5. The trailing arm according to claim 1, wherein said shock absorber mount comprises a shock absorber bracket that is mounted to said upper wall.

6. A heavy duty suspension system comprising:
   a frame;
   a pair of spaced apart trailing arms each including a forward portion pivotally supported by said frame and extending longitudinally to a rearward portion, and wherein each trailing arm includes a shock absorber bracket;
   an axle having opposing end portions pivotally supported respectively on said trailing arms, wherein said axle includes brackets attached to each of said end portions with a lower end of said brackets pivotally secured to each of said trailing arms at a lateral axis parallel to an axis of said axle and permitting articulation of said axle relative to said trailing arms about said lateral axis;
   a V-rod connecting said frame and said axle; and shock absorbers connecting said trailing arms and said frame.

7. The heavy duty suspension system according to claim 6, wherein each of said trailing arms includes at least a portion with an open bottom defined by a generally U-shaped cross-section, said U-shaped cross-section defined by opposing sides and an upper wall adjoining said opposing sides, and an end of each of said shock absorbers supported by one of said upper walls.

8. The heavy duty suspension system according to claim 6, wherein said V-rod includes first and second spaced apart ends extending to a common third end with said first and said second ends attached to one of said frame and said axle, and said third end attached to the other of said frame and said axle.

9. A heavy duty suspension system comprising:
   a frame;
   a pair of spaced apart trailing arms each including a forward portion pivotally supported by said frame and extending longitudinally to a rearward portion, wherein each of said trailing arms includes at least a portion with an open bottom defined by a generally U-shaped cross-section, said U-shaped cross-section defined by opposing sides and an upper wall adjoining said opposing sides, and wherein each trailing arm includes a shock absorber bracket that is associated with said upper wall;
   an axle having opposing end portions pivotally supported respectively on said trailing arms, wherein said axle includes brackets attached to each of said end portions with a lower end of said brackets pivotally secured to each of said trailing arms at a lateral axis parallel to an axis of said axle and permitting articulation of said axle relative to said trailing arms about said lateral axis;
   a V-rod connecting said frame and said axle; and
   shock absorbers connecting said trailing arms and said frame, wherein an end of each of said shock absorbers is supported by one of said upper walls.

10. A heavy duty suspension system comprising:
    a frame;
    a pair of spaced apart trailing arms each including a forward portion pivotally supported by said frame and extending longitudinally to a rearward portion;
    an axle having opposing end portions pivotally supported respectively on said trailing arms, wherein said axle includes brackets attached to each of said end portions with a lower end of said brackets pivotally secured to each of said trailing arms at a lateral axis parallel to an axis of said axle and permitting articulation of said axle relative to said trailing arms about said lateral axis;
    a V-rod connecting said frame and said axle; and
    shock absorbers that directly connect said trailing arms and said frame.

\* \* \* \* \*